(12) United States Patent
Yang

(10) Patent No.: US 11,156,364 B2
(45) Date of Patent: Oct. 26, 2021

(54) ELECTROMAGNETIC OVEN

(71) Applicant: SHANGHAI CHUNMI ELECTRONICS TECHNOLOGY CO., LTD., Shanghai (CN)

(72) Inventor: Hua Yang, Shanghai (CN)

(73) Assignee: Chunmi Technology (Shanghai) Co., Ltd., Shanghai (CN)

( * ) Notice: Subject to any disclaimer, the term of this patent is extended or adjusted under 35 U.S.C. 154(b) by 315 days.

(21) Appl. No.: 16/341,026

(22) PCT Filed: Apr. 10, 2018

(86) PCT No.: PCT/CN2018/082448
§ 371 (c)(1),
(2) Date: Apr. 10, 2019

(87) PCT Pub. No.: WO2018/188573
PCT Pub. Date: Oct. 18, 2018

(65) Prior Publication Data
US 2019/0234616 A1   Aug. 1, 2019

(30) Foreign Application Priority Data

Apr. 12, 2017 (CN) .......................... 201720378554.4

(51) Int. Cl.
*F24C 7/08*   (2006.01)
*F24C 15/10*  (2006.01)
*F24C 7/00*   (2006.01)
(52) U.S. Cl.
CPC ............. *F24C 7/08* (2013.01); *F24C 7/002* (2013.01); *F24C 15/105* (2013.01); *F24C 15/106* (2013.01)

(58) Field of Classification Search
CPC .......... F24C 7/08; F24C 15/105; F24C 7/002; F24C 15/106
See application file for complete search history.

(56) References Cited

U.S. PATENT DOCUMENTS

2017/0142780 A1* 5/2017 Hoare ..................... G01K 1/143
2017/0339751 A1* 11/2017 Meng ..................... H05B 6/062

FOREIGN PATENT DOCUMENTS

| CN | 203672389 U | * | 11/2013 | |
| WO | WO-2015196240 A1 | * | 12/2015 | ............. G01K 1/143 |
| WO | WO-2016070220 A1 | * | 5/2016 | ........... H05B 1/0266 |

* cited by examiner

*Primary Examiner* — Thien S Tran

(57) ABSTRACT

An electromagnetic oven includes a bottom case, a panel and a thermostat. The thermostat includes an inner bracket, a top end of the inner bracket is provided with a temperature sensing cover that contacts a cooking pot, and an inner cavity of the inner bracket is provided with a temperature measuring element for measuring a temperature of the temperature sensing cover. The thermostat protrudes from a through hole of the panel, and the temperature sensing cover contacts the cooking pot. A sealing structure for preventing soup from entering or a drainage structure for guiding the soup out of the bottom case is disposed between the through hole and the thermostat. In the present invention, a close contact between the thermostat and a bottom of the cooking pot may be realized, and an accurate measurement of a temperature of the bottom of the cooking pot by the thermostat is ensured.

17 Claims, 7 Drawing Sheets

ELECTROMAGNETIC OVEN

CROSS REFERENCE OF RELATED APPLICATION

This is a U.S. National Stage under 35 U.S.C 371 of the International Application PCT/CN2018/082448, filed Apr. 10, 2018, which claims priority under 35 U.S.C. 119(a-d) to CN 201720378554.4, filed Apr. 12, 2017.

BACKGROUND OF THE PRESENT INVENTION

Field of Invention

The present invention pertains to the field of electric heating ovens or stoves, and more particularly, relates to an electromagnetic oven.

Description of Related Arts

An electromagnetic oven, also known as an electromagnetic stove, realizes heating by passing an alternating current through a coil to generate an alternating magnetic field whose direction is constantly changing, so that an eddy current is produced inside a conductor located in the alternating magnetic field and a Joule heating effect of the eddy current causes the conductor to heat up.

The electromagnetic oven usually includes the following components: a panel for supporting a cookware, a high-voltage main board constituting a main current loop, a low-voltage main board for computer control functions, a LED (Light-Emitting Diode) circuit board for displaying a working state and transmitting operation instructions, a coil that converts a high-frequency alternating current into an alternating magnetic field, an IGBT (Insulated Gate Bipolar Transistor) that controls on/off of a large current by means of a low current signal, a bridge rectifier that converts an AC (Alternating Current) power to a DC (Direct Current) power, and a thermostat component that transmits a heat signal to a control circuit.

The electromagnetic ovens are popular among the public because of many advantages such as high heating speed, energy-saving and environmental-protection, ease of cleaning, precise temperature control, in addition to the above principle thereof.

However, at present, a temperature sensing surface of a temperature sensing element of the electromagnetic oven is basically disposed at a lower end of the panel. During the actual working process, the lag of temperature sensing will be caused because of heat transfer of the panel, and there will be a large difference between a temperature sensed by the temperature sensing element and a temperature of food material inside the cookware, which results in that cooking using the electromagnetic oven will usually cause a scorched bottom of the pot.

At present, when the temperature of the cooking pot is measured by the electromagnetic oven, the accuracy of the temperature measurement needs to be improved due to the structural constraints of the thermostat, and the assembly reliability of the temperature sensing structure in the thermostat needs to be improved.

Moreover, during cooking by the electromagnetic oven, it is inevitable that the soup will be spattered on the panel, and the spattered soup will pose a safety risk to the electrical components inside the electromagnetic oven.

SUMMARY OF THE PRESENT INVENTION

An object of the present invention is to provide an electromagnetic oven, so as to solve problems existing in the prior art.

The technical solutions of the present invention are as follows.

An electromagnetic oven includes: a bottom case, a panel, and a thermostat, wherein the bottom case is open at top, and an assembly receiving cavity is formed in an inner chamber of the bottom case; the panel is disposed at an open end of the bottom case, and is provided with a supporting surface at an upper end thereof for supporting a cooking pot; the thermostat includes an inner bracket, a top end of the inner bracket is provided with a temperature sensing cover that contacts the cooking pot; and an inner cavity of the inner bracket is provided with a temperature measuring element for measuring a temperature of the temperature sensing cover in a contact or non-contact manner;

the thermostat protrudes from a through hole of the panel in a telescopic manner; and the temperature sensing cover of the thermostat contacts the cooking pot;

a sealing structure for preventing soup from entering or a drainage structure for guiding the soup out of the bottom case is disposed between the through hole of the panel and the thermostat; and an elastic drive structure that drives the thermostat to protrude and retract provided at the thermostat.

The temperature measuring element which measures the temperature of the temperature sensing cover in the contact manner includes a thermistor, wherein the thermistor is fixed in the inner cavity of the inner bracket, and contacts a lower end of the temperature sensing cover; a fixed body is disposed in the inner cavity of the inner bracket, and the thermistor is disposed in the fixed body.

The temperature measuring element which measures the temperature of the temperature sensing cover in the non-contact manner includes an infrared probe, wherein the infrared probe is disposed in the inner cavity of the inner bracket, and a measuring end of the infrared probe faces the lower end of the temperature sensing cover.

The elastic drive structure is a driving spring; a mounting groove body which is open downward is formed at an outer sidewall of the inner bracket; an upper end of the driving spring is provided in the mounting groove body, and a lower end of the driving spring is coupled to a support frame in the bottom case; and the inner bracket slides along a guide hole of the support frame.

The temperature sensing cover envelops an upper end of the inner bracket or is inserted into the inner cavity of the inner bracket.

A mounting counterbore is formed at the lower end of the temperature sensing cover, and the mounting counterbore envelops the upper end of the inner bracket.

An engaging buckle is formed at the lower end of the temperature sensing cover, an engaging groove is formed at the upper end of the inner bracket, and the engaging buckle and the engaging groove are fixed together.

A sleeve inserted into the inner cavity of the inner bracket is formed at the lower end of the temperature sensing cover, and an annular groove for fixing is formed at an outer wall of the sleeve.

A convex ring that is fixed to the annular groove is formed at an inner wall of the inner cavity of the inner bracket, or a potted insulating layer connecting to the inner wall of the inner cavity is provided in the annular groove.

A transverse through hole is formed at a lower end of the inner bracket, and a limiting pin for limiting a protruding height of the thermostat is provided in the transverse through hole.

The guide hole is formed in the support frame, a lower groove body for accommodating the driving spring is formed at an inner edge of the guide hole, and the lower groove body is open upward.

A support protrusion is formed at an inner wall of the bottom case, an insulating layer is provided on the support protrusion, the panel is provided on the insulating layer, and a fixing plate for fixing the panel is provided on an upper end of the bottom case.

An inclined water guide surface is formed at an upper end of the insulating layer, a water guide hole is formed at the insulating layer, and a water retaining rib for protecting an electrical component is formed in the bottom case.

The drainage structure includes a bracket guide tube disposed at a bottom of the lower groove body, and the bracket guide tube is inserted into a flow guide hole of the bottom case.

A through hole protection component is disposed in the through hole of the panel; the through hole protection component includes a wrapping sleeve disposed in the through hole; an annular limiting plate that contacts an upper end of the panel is formed at an upper end of the wrapping sleeve; and a locking nut or a locking spring leaf is provided at a lower end of the wrapping sleeve.

The sealing structure is a sealing ring, which is disposed in the through hole, and an inner circle of the sealing ring contacts the thermostat.

The sealing structure includes an assembly sleeve disposed at the through hole; a sealing gasket is provided at an upper end of the assembly sleeve; an upper end of the sealing gasket contacts the cooking pot, and a lower end of the sealing gasket contacts the temperature sensing cover of the thermostat.

The sealing structure includes a sealing sleeve, wherein an upper end of the sealing sleeve is fixed to a lower end of the panel, and an engaging groove engaged with a mounting plate of the inner bracket is formed at an inner wall of the sealing sleeve.

A protrusion limiting device for limiting the protruding height of the thermostat is provided at a sidewall of the thermostat, the protrusion limiting device includes a protrusion limiting rib, and a centering limiting rib for guiding during a protruding and retracting process of the thermostat is also disposed at the sidewall of the thermostat.

In the present invention, the through hole is formed at the panel, and the telescopic thermostat is disposed in the through hole, so that a close contact between the thermostat and the bottom of the cooking pot may be realized, and the accurate measurement of the temperature of the bottom of the cooking pot by the thermostat is ensured. Through the optimization of the temperature sensing cover of the thermostat, a heat loss in the conduction process is reduced; insulation, waterproofing and protection after the panel is broken are realized through the insulating layer, the water guide hole and the water retaining rib at the lower end of the panel; and the sealing structure or the drainage structure at the through hole of the panel prevents the soup on the panel from entering the electrical components in the bottom case. The present invention realizes the precise temperature control of the electromagnetic oven and improves use safety.

In figures: 1: bottom case; 2: panel; 3: thermostat; 4: support frame; 5: driving spring; 6: limiting pin; 7: insulating layer; 8: wrapping sleeve; 9: assembly sleeve; 31: inner bracket; 32: temperature sensing cover; 33: temperature measuring element; 34: insulating mat; 35: thermistor; 36: mounting groove body; 37: thermistor holder; 38: infrared probe; 39: annular groove; 41: guide hole; 42: lower groove body; 43: bracket guide tube; 61: protrusion limiting rib; 62: centering limiting rib; 621: inclined portion; 622: straight portion; 71: water guide hole; 72: fixing plate; 73: water retaining rib; 81: locking nut; 82: locking spring leaf; 91: sealing gasket; 92: sealing sleeve; and 93: engaging groove.

DETAILED DESCRIPTION OF THE PREFERRED EMBODIMENT

Figure 1:
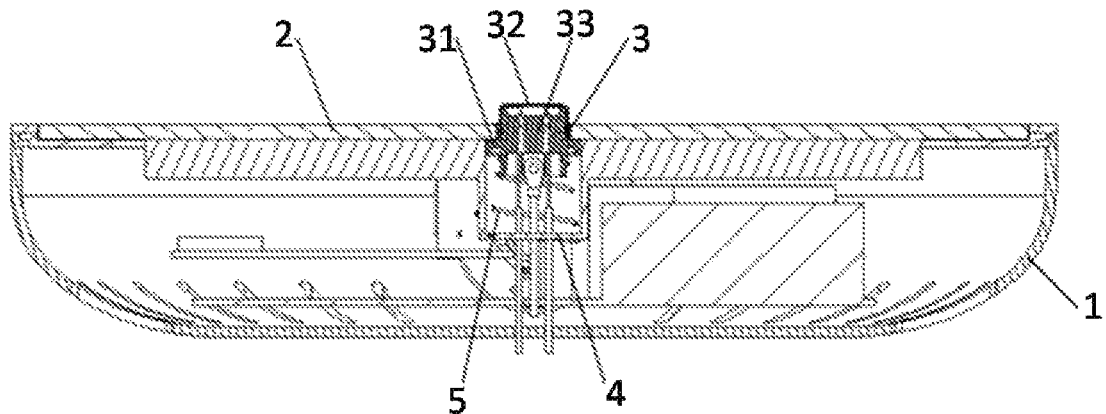
FIG. 1 is an overall structural schematic diagram of an electromagnetic oven according to the present invention.

Hereinafter, the present invention will be described in detail with reference to the accompanying drawings and the preferred embodiment:

As shown in FIG. 1, an electromagnetic oven includes a bottom case 1 and a panel 2, wherein the bottom case 1 is open at top, and an assembly receiving cavity is formed in an inner chamber of the bottom case 1; the panel 2 is disposed at an open end of the bottom case 1 and is provided with a supporting surface at an upper end thereof for supporting a cooking pot; a thermostat 3 for telescopically measuring the cooking pot is provided in a through hole of the panel 2; the thermostat 3 includes an inner bracket 31, a top end of the inner bracket 31 is provided with a temperature sensing cover 32 that contacts the cooking pot, and an inner cavity of the inner bracket 31 is provided with a temperature measuring element 33 for measuring a temperature of the temperature sensing cover 32 in a contact or non-contact manner.

The temperature sensing cover 32 at an upper end of the telescopic thermostat 3 may protrude from an upper end surface of the panel 2; when an operator places the cooking pot containing a food material on the panel 2, the cooking pot will press down the telescopic thermostat 3; at this time, the temperature sensing cover 32 contacts the cooking pot, and the thermostat 3 closely contacts the cooking pot to directly sense a temperature of the cooking pot.

The through hole of the panel 2 is located in the middle of the panel 2, and the through hole of the panel 2 has a larger diameter than an outer diameter of a protruding end of the thermostat 3, so that the thermostat can axially protrude and retract along the through hole.

The temperature sensing cover 32 contacts the cooking pot to directly conduct the temperature of the cooking pot, and the temperature measuring element 33 in the thermostat 3 measures the temperature of the temperature sensing cover 32, so as to obtain an actual heating temperature of a bottom of the cooking pot, and avoid a phenomenon of burning-out of the cooking pot caused by overheating.

Figure 2:
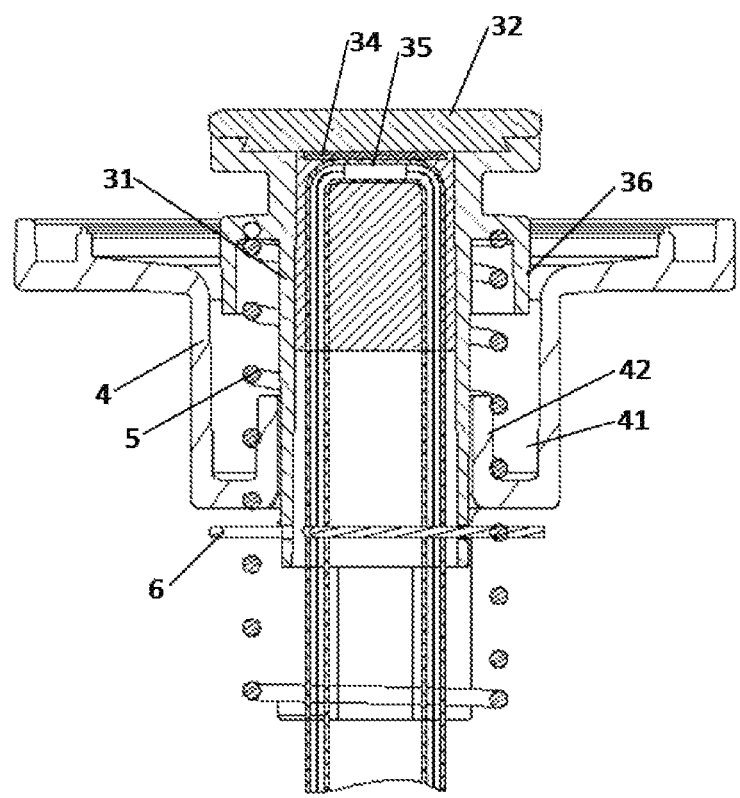
FIG. 2 is a first assembly diagram of a thermistor according to the present invention.
Figure 3:
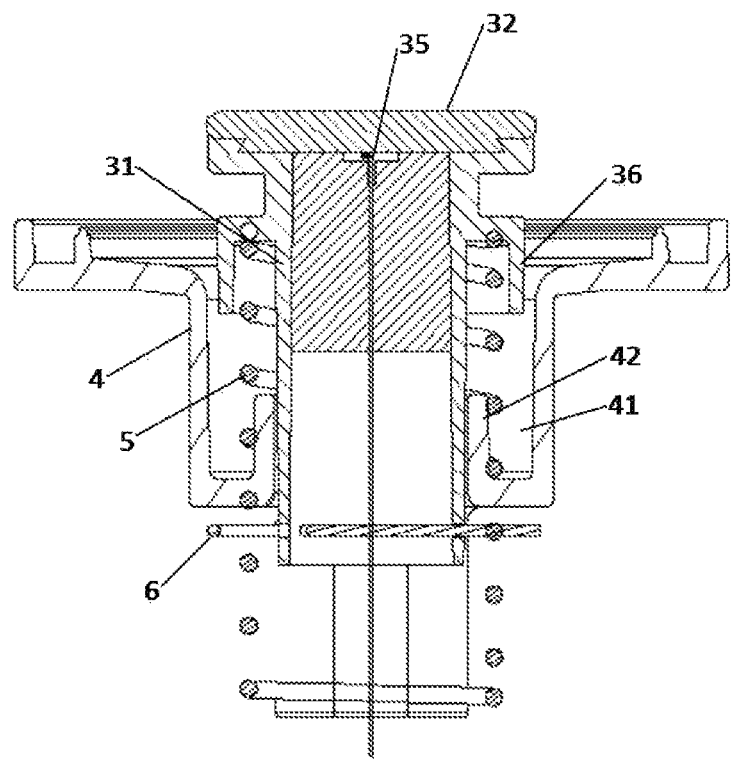
FIG. 3 is a second assembly diagram of the thermistor according to the present invention.
Figure 4:
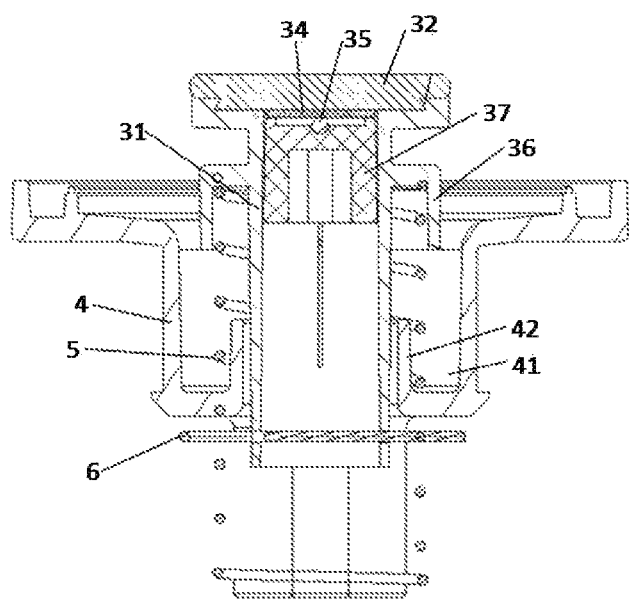
FIG. 4 is a third assembly diagram of the thermistor according to the present invention.

As shown in FIGS. 2-4, the temperature measuring element 33 which measures the temperature of the temperature sensing cover 32 in the contact manner includes a thermistor 35, wherein the thermistor 35 is fixed in the inner cavity of the inner bracket 31, and contacts a lower end of the temperature sensing cover 32; a fixed body is disposed in the inner cavity of the inner bracket 31, and the thermistor 35 is disposed in the fixed body.

An engaging buckle is formed at the lower end of the temperature sensing cover 32, an engaging groove is formed at an upper end of the inner bracket, and the engaging buckle and the engaging groove are fixed together.

The engaging buckle and the engaging groove enable the temperature sensing cover 32 and the inner bracket 31 to be better bonded after injection molding processing, which improves an engaging strength of the temperature sensing cover 32 with the inner bracket 31.

A radial through hole is formed in the inner bracket 31, and a limiting pin 6 is inserted to and fixed in the radial through hole. In the preferred embodiment of the present invention, only a manner in which the limiting pin 6 restricts an upward movement of the inner bracket 31 is listed, but it is not limited to a manner of constraining of a moving distance in other forms at an outer wall of the inner bracket 31.

The limiting pin 6 restricts a maximum amount of vertically upward displacement of the inner bracket 31. Due to a combined action of the limiting structure and a driving spring 5, the temperature sensing cover of the thermostat 3 can be freely stretched up and down, so that the temperature sensing cover may closely contact the cooking pot whose temperature needs to be measured, so as to improve a temperature sensing accuracy.

The driving spring 5 may ensure that the thermostat 3 is pressed by the cooking pot and contacts the cooking pot, and the limiting pin 6 may ensure that the thermostat 3 does not protrude from the through hole of the panel 2 in a state of no cooking pot on the panel 2, so as to ensure a use stability of the telescopic thermostat, and also to increase a service life of the telescopic thermostat.

As shown in FIG. 2, the temperature sensing cover 32 is a thermal conductive temperature sensing cover of a metallic material, the fixed body is a potted body, and the thermistor 35 is disposed in an insulating sleeve in the potted body.

The temperature sensing cover 32 of the metallic material is a copper temperature sensing cover or an aluminum temperature sensing cover. An insulating mat 34 is disposed between the insulating sleeve and the lower end of the temperature sensing cover 32. The insulating sleeve and the insulating mat 34 form a double insulation to ensure safety without grounding structure.

The insulating mat 34 is attached to the lower end of the temperature sensing cover 32, the thermistor 35 is attached to a lower end of the insulating mat 34, and then the potted body is formed by potting with an insulating material.

The potted body can, on the one hand, further enhance an integral combination of the temperature sensing cover 32 and the inner bracket 31, and on the other hand, effectively prevent moisture and improve an overall performance of the thermostat.

As shown in FIG. 3, the temperature sensing cover 32 is a thermal conductive temperature sensing cover of a non-metallic material, the fixed body is a potted body, the thermistor 35 is encapsulated in the potted body, and the thermistor 35 contacts the temperature sensing cover 32.

The temperature sensing cover of the non-metallic material is made of thermal conductive ceramic, thermal conductive silicone, or plastic. The potted body is made of a waterproof insulating material.

As shown in FIG. 4, the temperature sensing cover 32 is a thermal conductive temperature sensing cover of a metallic material, and the fixed body is a thermistor holder 37.

The thermistor 35 is mounted in the thermistor holder 37 in a manner of interference assembly. The thermistor holder 37 is pressed into the inner bracket 31, and an insulating mat 34 is disposed between the thermistor 35 and the lower end of the temperature sensing cover 32.

The manner in which the thermistor holder 37 and the inner bracket 31 are fixed may be, but not limited to, interference fit.

A material of the thermistor holder 37 is silicone or plastic.

Figure 5:
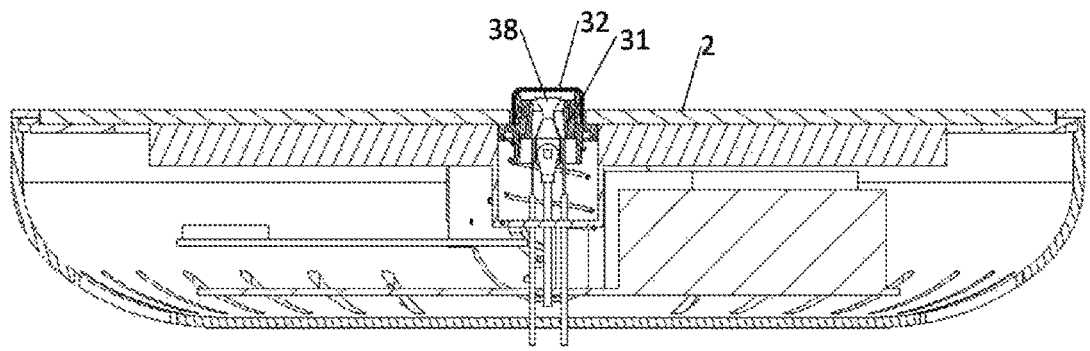
FIG. 5 is an assembly diagram of an infrared probe according to the present invention.

As shown in FIG. 5, the temperature measuring element 33 which measures the temperature of the temperature sensing cover 32 in the non-contact manner includes an infrared probe 38. The infrared probe 38 is disposed in the inner cavity of the inner bracket 31, and a measuring end of the infrared probe 38 faces the lower end of the temperature sensing cover 32.

The temperature sensing cover 32 is made of a material having good heat conduction and a fixed surface emissivity, such as copper, aluminum, and graphite. The temperature sensing cover 32 transmits its own temperature state to the infrared probe 38 in the form of heat radiation at a specific surface emissivity, and the infrared probe 38 can obtain current temperature state information of the cooking pot by a processing operation.

A mounting through hole is formed in the fixed body; a top groove is formed at an upper end of the fixed body; the mounting through hole is intercommunicated with the top groove; the infrared probe 38 is disposed in the mounting through hole, the measuring end of the infrared probe 38 protrudes from the mounting through hole to be located in the top groove, and an upper end of the infrared probe 38 is not in contact with the temperature sensing cover 32.

As shown in FIG. 2 to FIG. 4, a mounting groove body 36 which is open downward is formed at the outer sidewall of the inner bracket 31. The driving spring 5 is provided in the mounting groove body 36, and a lower end of the driving spring 5 is coupled to a support frame 4 in the bottom case 1. The inner bracket 31 slides along a guide hole 41 of the support frame 4.

The guide hole 41 is formed in the support frame 4, a lower groove body 42 for accommodating the driving spring 5 is formed at an inner edge of the guide hole 41, and the lower groove body 42 is open upward.

The support frame 4 is fixed in the bottom case 1, and the driving spring 5 may drive the inner bracket 31 to move upward, so that the temperature sensing cover 32 may protrude from the upper end of the panel 2.

An upper end of the driving spring 5 is inserted into the mounting groove body 36, and the driving spring 5 is adjacent to an outer groove wall of the mounting groove body 36; the lower end of the driving spring 5 is inserted into the lower groove body 42, and the driving spring 5 is adjacent to an inner groove wall of the lower groove body 42. The above structure ensures installation of the driving spring 5, and the lower groove body 42 may also guide up and down movement of the inner bracket 31.

The driving spring 5 is a shape memory metal spring.

At a normal temperature, the driving spring 5 is in a free state. When the electromagnetic oven starts to work, the temperature of the cooking pot begins to rise, and is transmitted to an environment surrounding the thermostat 3 by means of radiation; an ambient temperature of the shape memory metal spring also accordingly increases; at the time when the ambient temperature of the shape memory metal spring reaches a set phase change temperature, the shape memory metal spring is restored to an initial set state, and jacks up the thermostat 3, such that a temperature sensing surface is pressed against the bottom of the cooking pot, and in this state, the thermostat 3 may sense a real-time temperature of the cooking pot in a better way.

The shape memory metal spring is made of a memory metal.

The shape memory metal spring has a phase change temperature of 70° C. or less.

As shown in FIGS. 6-9, the temperature sensing cover 32 envelops the upper end of the inner bracket or is inserted into the inner cavity of the inner bracket 31. The inner bracket 31 includes an upper mounting section, the mounting groove body 36 in the middle, and a lower sliding fit section. The inner bracket 31 is hollow, and thus is convenient for installing an inner bracket cavity of the temperature measuring element 33. The inner bracket cavity may facilitate the lead-out of wires of the temperature measuring element 33.

Figure 6:
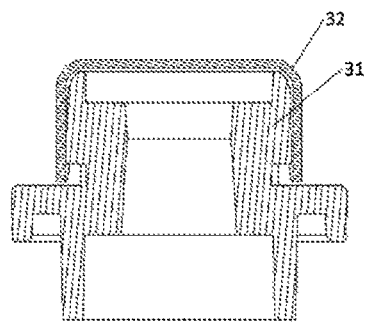
FIG. 6 is a first assembly diagram of a temperature sensing cover according to the present invention.

As shown in FIG. 6, a mounting counterbore is formed at the lower end of the temperature sensing cover 32, and the mounting counterbore envelops the upper end of the inner bracket 31.

Meanwhile, a thermal insulation ring groove is formed at a transition between the upper mounting section and the mounting groove body 36 in the middle, and an axial length of the upper mounting section is greater than a depth of the mounting counterbore, so that the lower end of the temperature sensing cover 32 is suspended, and the upper mounting section is entirely located in the mounting counterbore to ensure the measurement accuracy of the temperature measuring element 33 in the inner bracket 31.

Figure 7:
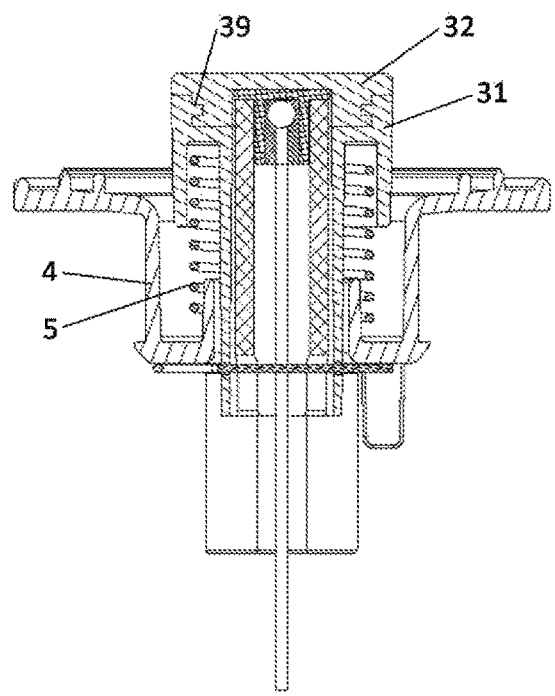
FIG. 7 is a second assembly diagram of the temperature sensing cover according to the present invention.

As shown in FIG. 7, a sleeve inserted into the inner cavity of the inner bracket 31 is formed at the lower end of the temperature sensing cover 32, an annular groove 39 for fixing is formed at an outer wall of the sleeve, and a convex ring that is fixed to the annular groove 39 is formed at an inner wall of the inner cavity of the inner bracket 31.

The annular groove 39 and the convex ring are engaged with each other to fix the temperature sensing cover 32 to the upper end of the inner bracket 31. The annular groove 39 may also ensure an installation position of the temperature measuring element 33 during the installation.

The annular groove 39 and the convex ring may greatly reduce the assembly difficulty, avoid an assembly gap, and reduce an exposed area of the temperature sensing cover, so as to reduce the overall heat dissipation of the thermostat and make the temperature sensing more precise.

Figure 8:
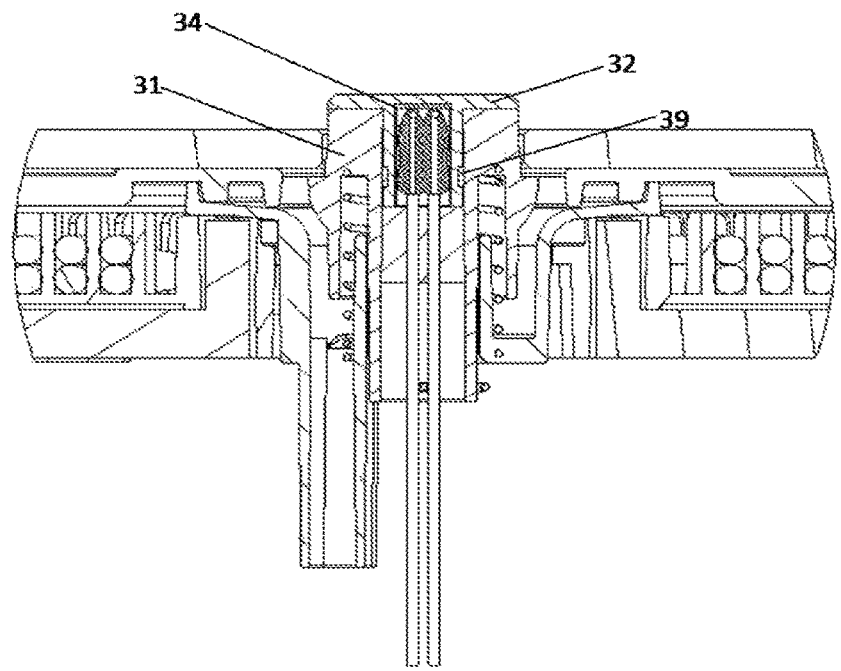
FIG. 8 is a third assembly diagram of the temperature sensing cover according to the present invention.
Figure 9:
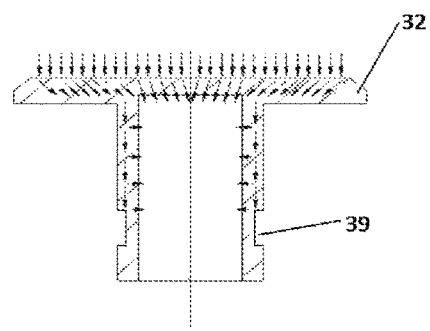
FIG. 9 is a schematic diagram of heat conduction of the temperature sensing cover in FIG. 8.

As shown in FIGS. 8-9, a sleeve inserted into the inner cavity of the inner bracket 31 is formed at the lower end of the temperature sensing cover 32, and an annular groove 39 for fixing is formed at an outer wall of the sleeve. A potted insulation layer connecting to the inner wall of the inner cavity is provided in the annular groove 39.

The inner bracket cavity is a heat collecting cavity capable of collecting heat, wherein a portion of heat directly enters the heat collecting cavity through the temperature sensing cover 32, and the remaining portion of heat enters the heat collecting cavity in a radial direction by the guide of the sleeve, such that a stereoscopic temperature sensing is formed in the heat collecting cavity. Thereafter, precise temperature sensing is realized through the thermistor, wherein the thermistor is wrapped in a stereoscopic temperature field which changes in real time depending on the temperature of the bottom of the cooking pot, and the sensing of a change in the temperature of the bottom of the cooking pot can become faster and more accurate, so as to improve the temperature sensing accuracy of the thermostat.

The thermistor includes a wafer glass sealing layer for packaging wafers, a wafer lead which connects the wafers, wherein the wafer glass sealing layer and the wafer lead are covered with an encapsulated insulating layer.

A withstand voltage level between the temperature sensing cover and the wafers and the wafer lead is ≥3000 V.

A material of the encapsulated insulating layer is an epoxy resin or a similar mixed glue which is curable by drying or baking. An insulating mat 34 is disposed between the thermistor and the temperature sensing cover 32.

The insulating mat is a material having excellent insulation and temperature resistance performance, such as silicone, Teflon or polyimide. An insulating sleeve is disposed at an inner wall of the sleeve.

The insulating sleeve is made of a material having excellent insulation and temperature resistance performance, such as silicone, Teflon or polyimide. The thermistor is fixed to the sleeve, the temperature sensing cover 32, and the inner bracket by a potted insulating layer.

A material of the potted insulating layer is an epoxy resin or a similar mixed glue which is curable by drying or baking. The presence of the annular groove 39 enables the cured potted insulation layer to effectively bond the temperature sensing cover and the inner bracket tightly and securely.

Three vertical insulating layers are disposed between the wafers and the temperature sensing cover 32. Three vertical insulating layers sequentially include the wafer glass sealing layer, the encapsulated insulating layer and the insulating mat.

Three annular insulating layers are formed between the wafer lead and the sleeve. Three annular insulating layers sequentially include the encapsulated insulating layer, the potted insulating layer and the insulating sleeve.

Figure 10:
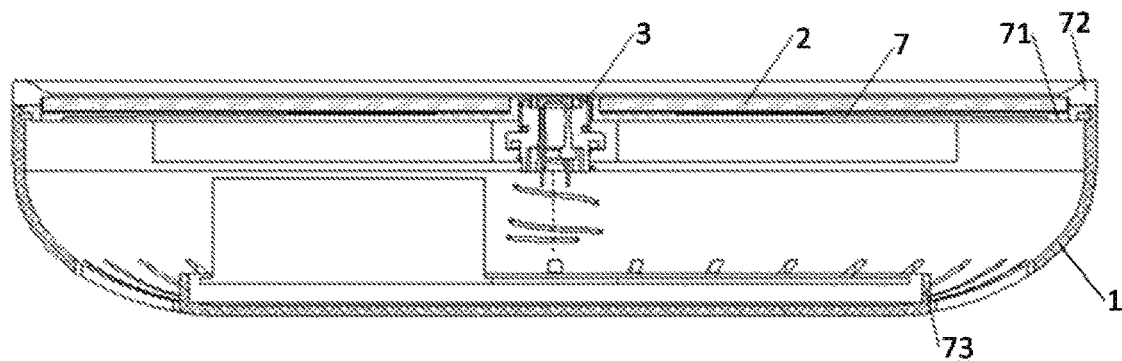
FIG. 10 is a first assembly diagram of an insulating layer according to the present invention.

As shown in FIG. 10, a support protrusion is formed at an inner wall of the bottom case 1, an insulating layer 7 is provided on the support protrusion, the panel 2 is provided on the insulating layer 7, and a fixing plate 72 for fixing the panel 2 is provided on an upper end of the bottom case 1.

An inclined water guide surface is formed at an upper end of the insulating layer 7, a water guide hole 71 is formed at the insulating layer, and a water retaining rib 73 for protecting an electrical component is formed in the bottom case 1.

The inclined water guide surface and the water guide hole 71 are formed on a top side of the insulating layer 7, and the water retaining rib 73 is formed at bottom of the bottom case.

The water guide hole 71 is disposed at an outer periphery of the insulating layer 7, and the bottom of the bottom case 1 is provided with the water retaining rib 73 extending toward the top.

The inclined water guide surface is gradually inclined toward the water guide hole 71 along a top surface of the insulating layer 7, so that water flows into the bottom of the bottom case 1 through the water guide hole 71; the water retaining rib 73 isolates water from the electrical component, so that water is drained from a vent of the bottom case, in such a manner, an insulating structure is formed to ensure the insulation performance of the panel of the electromagnetic oven after it is damaged.

Figure 11:
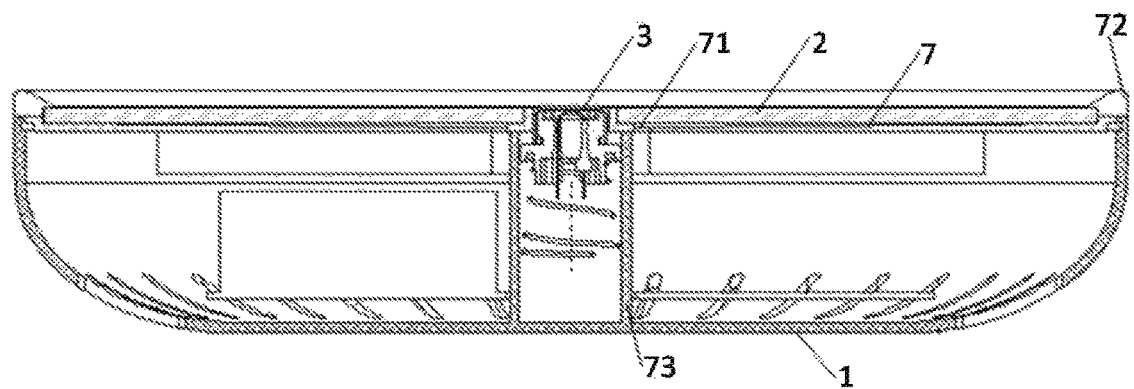
FIG. 11 is a second assembly diagram of the insulating layer according to the present invention.

As shown in FIG. 11, an inclined water guide surface and a water guide hole 71 are formed at a top side of the insulating layer 7, and a water retaining rib 73 is formed at the bottom of the bottom case.

The water guide hole 71 is provided at an inner periphery of the insulating layer 7, and the water retaining rib 73 that engages with the inner periphery of the insulating layer 7 is provided at the bottom of the bottom case.

The inclined water guide surface is gradually inclined toward the water guide hole 71 along a top surface of the insulating layer 7, so that water flows into the bottom of the bottom case by passing through the water guide hole 71; the water retaining rib 73 isolates water from the electrical component, so that water is drained from a vent of the bottom case, in such a manner, an insulating structure is formed to ensure the insulation performance of the panel of the electromagnetic oven after it is damaged.

Figure 12:
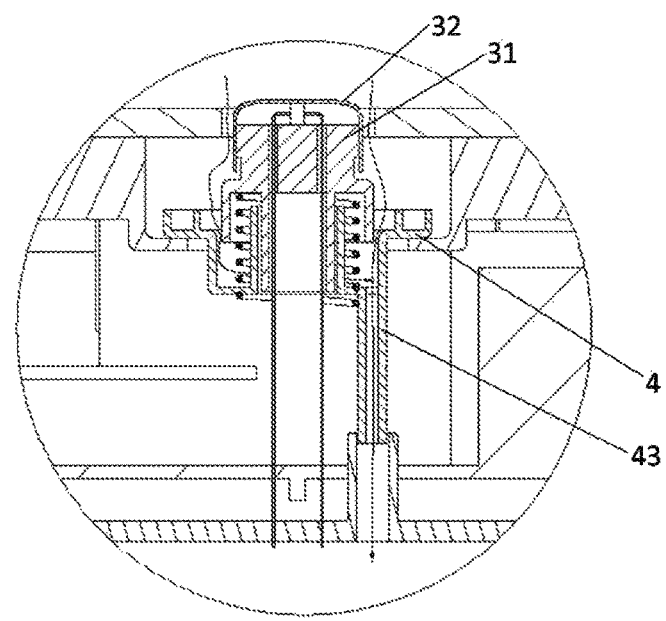
FIG. 12 is a schematic diagram of drainage of a support frame according to the present invention.

As shown in FIG. 12, a bracket guide tube 43 is disposed at a bottom of the lower groove body 42, and the bracket guide tube 43 is inserted into a flow guide hole of the bottom case 1.

A plurality of annular water retaining rings are formed on an upper end of the support frame 4; the water retaining rings may collect soup flowing from the through hole of the panel 2, and introduce the soup in the through hole into the lower groove body 42; the bracket guide tube 43 is formed at the lower groove body 42, and may guide the soup out of the bottom case 1.

A guide post is formed in the bottom case 1, the flow guide hole is formed in the guide post, and the bracket guide tube 43 is inserted into the flow guide hole.

An inclined surface for water guiding is formed in the lower groove body 42.

The number of water retaining rings is more than one, and a diameter of the water retaining rings is larger than the diameter of the through hole in the panel 2.

Figure 13:
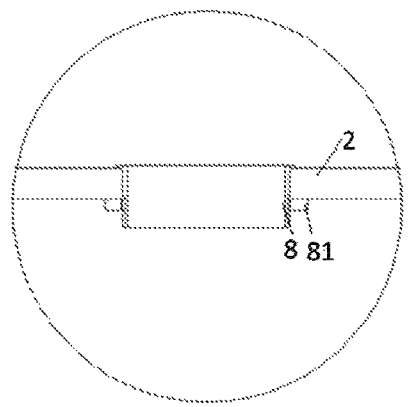
FIG. 13 is a first assembly diagram of a wrapping sleeve according to the present invention.
Figure 14:
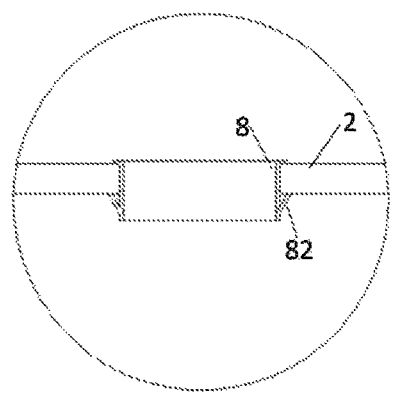
FIG. 14 is a second assembly diagram of the wrapping sleeve according to the present invention.

As shown in FIGS. 13-14, a through hole protection component is disposed in the through hole of the panel 2; the through hole protection component includes a wrapping sleeve 8 disposed in the through hole; an annular limiting plate that contacts the upper end of the panel 2 is formed at an upper end of the wrapping sleeve 8; and a locking nut 81 or a locking spring leaf 82 is provided at a lower end of the wrapping sleeve 8.

The wrapping sleeve 8 wraps an inner side and upper and lower end edges of the through hole, and clamps the panel 2.

The wrapping sleeve 8 made of a metal material is fixed to the panel 2 by riveting.

The wrapping sleeve 8 made of a hard plastic material is fixed to the panel 2 by hot pressing or ultrasonic welding.

The wrapping sleeve 8 includes an external thread sleeve penetrating through the through hole and a locking nut 81 for fixing the external thread sleeve at a bottom side of the panel 2.

The locking spring leaf 82 fastened and fixed to the bottom side of the panel 2 is provided at a lower portion of the wrapping sleeve 8.

The locking spring leaf 82 is made of metal.

The through hole protection component may protect the through hole of the panel 2, prevent the panel from breaking, and protect reliability and safety of product use. Meanwhile, the wrapping sleeve 8 may provide guidance for the thermostat 3.

Figure 15:
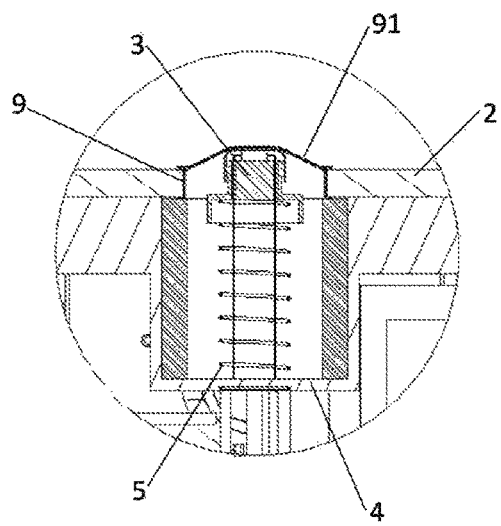
FIG. 15 is a first assembly diagram of a through hole of a panel according to the present invention.
Figure 16:
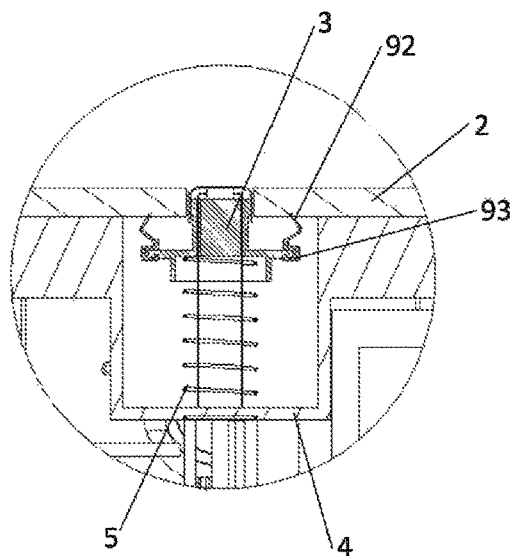
FIG. 16 is a second assembly diagram of the through hole of the panel according to the present invention.

As shown in FIGS. 15-16, a sealing structure for preventing the soup from entering the inner cavity is disposed between the through hole of the panel 2 and the thermostat 3.

A drainage structure or a sealing structure for preventing the soup from entering the inner cavity is provided between the through hole of the panel 2 and the thermostat 3.

The sealing structure prevents the soup at the bottom of the cooking pot and at the upper end of the panel 2 from entering interior of the electromagnetic oven by passing through a gap between the through hole and the thermostat 3.

The sealing structure is a sealing ring, which is disposed in the through hole.

An annular convex rib is formed at an inner wall of the sealing ring, and an inner diameter of the annular convex rib is interference fitted to an outer wall of the thermostat 3. The annular convex rib may effectively reduce a contact area of the interference fit of the outer wall of the thermostat 3, and reduce effects on a resistance of a telescopic stroke of the thermostat 3.

As shown in FIG. 15, the sealing structure includes an assembly sleeve 9 disposed at the through hole, wherein a sealing gasket 91 is provided at an upper end of the assembly sleeve 9, an upper end of the sealing gasket 91 contacts the cooking pot, and a lower end of the sealing gasket 91 contacts the temperature sensing cover 32 of the thermostat 3.

The sealing structure is the sealing gasket 91 that blocks the through hole and elastically bonds to the temperature sensing cover 32 of the thermostat 3, and the assembly sleeve 9 that engages with the through hole is formed at the lower end of the sealing gasket 91.

A press block is disposed in the bottom case, and the press block presses a lower end of the assembly sleeve 9 against a lower end surface of the panel 2.

The press block is a hollow cylindrical press block, and a lower end of the press block is fixed to the support frame.

The sealing gasket 91 is made of a sealing silicone, and the sealing gasket 91 may effectively contact and wrap the cooking pot because of its elastic deformation.

The sealing gasket 91 has certain elasticity and extensibility, in a free state, the thermostat 3 pushes the sealing gasket 91 up to a certain height under the action of the driving spring. After placing the cooking pot, under the gravity of the cooking pot and the food material contained therein, the driving spring deforms to retract the whole thermostat 3, so as to be substantially flush with the panel 2. At the same time, under an elastic force of the driving spring, the temperature sensing cover 32 of the thermostat 3 is in tight contact with the bottom of the cooking pot, so that the temperature sensing cover 32 of the thermostat 3 may well sense the temperature of the bottom of the cooking pot.

As shown in FIG. 16, the sealing structure is a sealing sleeve 92. An upper end of the sealing sleeve 92 is fixed to the lower end of the panel 2, and a lower end of the sealing sleeve 92 is fixed to a support frame of the thermostat 3.

An axial cross-section of the sealing sleeve 92 is in a fold-line shape.

The sealing sleeve 92 is made of a sealing silicone, and may prevent juice outside the thermostat 3 from entering the interior of the electromagnetic oven.

During a protruding-retracting process of the thermostat 3, an angle of an edgefold of the sealing sleeve 92 is in a process of getting larger or smaller, which may not only ensure the sealing effect, but also reduce a resistance during the protruding-retracting process of the thermostat 3.

The upper end of the thermostat 3 is the temperature sensing cover 32 parallel to the panel 2.

The sealing structure includes the sealing sleeve 92. The upper end of the sealing sleeve 92 is fixed to the lower end of the panel 2. An engaging groove 93, which is engaged with a mounting plate of the inner bracket 31, is formed at an inner wall of the sealing sleeve 92.

The mounting plate is formed by extending outwardly at the outer wall of the inner bracket 31, and the engaging groove 93 is elastically fitted to the mounting plate.

Figure 17:
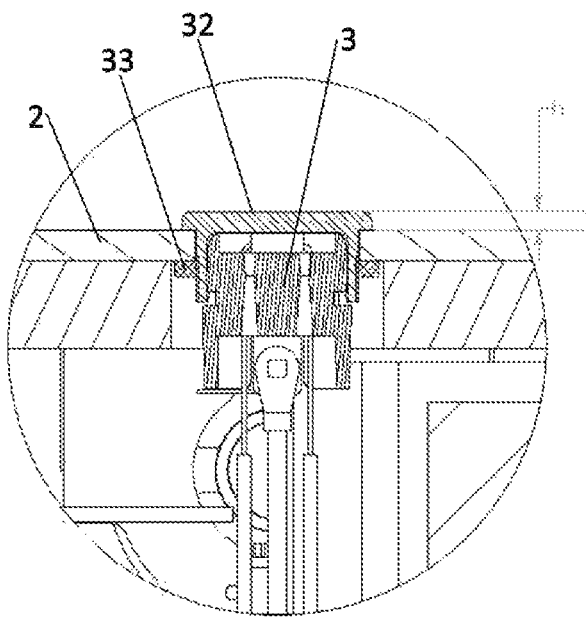
FIG. 17 is an assembly diagram of fixing and installing of the temperature sensing cover according to the present invention.

As shown in FIG. 17, in addition to the above-mentioned telescopic fixing manner, the thermostat 3 can also use a fixing structure to enable the temperature sensing cover 32 of the thermostat to slightly protrude from the upper end of the panel 2, and the temperature sensing cover 32 at the upper end of the thermostat 3 protrudes from the upper end of the panel 2 up to a height of 0 mm to 5 mm.

The temperature sensing cover 32 may be in direct contact with the cooking pot on the panel 2, and the temperature sensing cover 32 may directly sense the temperature of the cooking pot, so that an actual temperature of the food material in the cooking pot may be truly sensed.

A distance between the temperature sensing cover 32 and the panel 2 is h, and $0 \leq h \leq 5$ mm, which may not only ensure the direct contact between the temperature sensing cover 32 and the bottom of the cooking pot, but also reduce a gap between the cooking pot and the panel 2, and thus is widely applicable to all kinds of pots to facilitate the cooking operation of the user.

When the distance h between the temperature sensing cover 32 and the panel 2 is less than 0 mm, the panel 2 supports the cooking pot, and the temperature sensing cover 32 is not in contact with the cooking pot, which directly affects the temperature sensing of the thermostat 3.

When the distance h between the temperature sensing cover 32 and the panel 2 is greater than 5 mm, the bottom of the cooking pot needs to be provided with a relatively high convex hull avoidance sensor, which has a great influence on the action of stir-fry of cooking.

A material such as an epoxy resin, a 502-glue, a drying rubber or a RTV (Room Temperature Vulcanizing) silicone is filled at a position of the void between the thermostat 3 and the through hole, and the thermostat 3 is fixed to a preset position of the panel by natural surface drying or drying of a filler.

An external thread can also be formed at an outer wall of the temperature sensing cover 32, and a nut which is screwed to the external thread is disposed at the lower end of the panel 2 to fix the thermostat 3.

Figure 18:
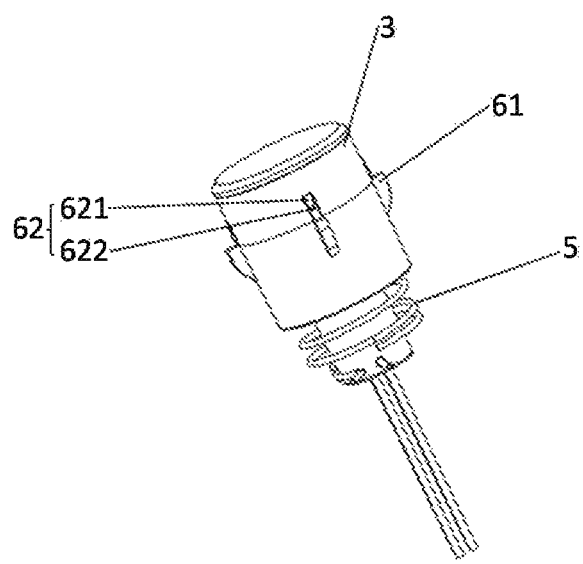
FIG. 18 is an assembly perspective view of a protrusion limiting rib according to the present invention.

As shown in FIG. 18, a protrusion limiting device for limiting a protruding height of the thermostat 3 is provided at a sidewall of the thermostat 3, and the protrusion limiting device includes a protrusion limiting rib 61. A centering limiting rib 62 for guiding during the protruding and retracting process of the thermostat 3 is also disposed at the sidewall of the thermostat 3.

The protrusion limiting rib 61 and the centering limiting rib 62 are provided in plural, and an upper end of the protrusion limiting rib 61 is abutted against the panel 2, so that the protruding height of the thermostat 3 from the panel 2 may be restricted.

The centering limiting rib 62 and the protrusion limiting rib 61 are longitudinally aligned.

The centering limiting rib 62 and the protrusion limiting rib 61 are longitudinally staggered.

The centering limiting rib 62 includes an upper inclined portion 621 and a lower straight portion 622.

A height of the inclined portion 621 gradually increases from top to bottom, and a height of the straight portion 622 is the same as the maximum height of the inclined portion 621.

The centering limiting rib 62 enables the thermostat 3 to slide along the through hole of the panel 2 and protrudes therefrom, and during the protruding process, the centering limiting rib 62 may ensure that the thermostat 3 is coaxial to the through hole after protruding, so as to ensure the protruding accuracy. Furthermore, the centering limiting rib 62 may also play the role of deceleration in the process of sliding and protruding, and the centering limiting rib 62 may avoid shake in a circumferential direction after protruding of the thermostat 3 to make the assembly compact.

The upper end of the protrusion limiting rib 61 is a plane that contacts the panel 2, and a lower end of the protrusion limiting rib 61 is in an arc shape.

The centering limiting rib 62 and the protrusion limiting rib 61 are uniformly distributed in an annular direction.

The protruding height of the thermostat 3 from the panel 2 is H, and the height H satisfies the following condition of $0.5 \text{ mm} \leq H \leq 6 \text{ mm}$.

The centering limiting rib 62 is fitted to the inner wall of the through hole to prevent the thermostat 3 from being titled to one side, thereby ensuring a uniform gap between the thermostat 3 and the panel 2. The height of the centering limiting rib 62 is 0.1 mm to 0.5 mm.

In the present invention, the through hole is formed at the panel, and the telescopic thermostat is disposed in the through hole, so that a close contact between the thermostat and the bottom of the cooking pot may be realized, and the accurate measurement of the temperature of the bottom of the cooking pot by the thermostat is ensured. Through the optimization of the temperature sensing cover of the thermostat, the heat loss in the conduction process is reduced; insulation, waterproofing and protection after the panel is broken are realized through the insulating layer, the water guide hole and the water retaining rib at the lower end of the panel; and the sealing structure or the drainage structure at the through hole of the panel prevents the soup on the panel from entering the electrical components of the bottom case.

The present invention realizes the precise temperature control of the electromagnetic oven and improves use safety.

What is claimed is:

1. An electromagnetic oven, comprising:
a bottom case (1), a panel (2), and a thermostat (3), wherein:
the bottom case (1) is open at top, and an assembly receiving cavity is formed in an inner chamber of the bottom case (1);
the panel (2) is disposed at an open end of the bottom case (1), and is provided with a supporting surface at an upper end thereof for supporting a cooking pot;
the thermostat (3) comprises an inner bracket (31), a top end of the inner bracket (31) is provided with a temperature sensing cover (32) that contacts the cooking pot, and an inner cavity of the inner bracket (31) is provided with a temperature measuring element (33) for measuring a temperature of the temperature sensing cover (32) in a contact or non-contact manner;
the thermostat (3) protrudes from a through hole of the panel (2) in a telescopic manner, and the temperature sensing cover (32) of the thermostat (3) closely contacts the cooking pot;
a sealing structure for preventing soup from entering the bottom case (1) or a drainage structure for guiding the soup out of the bottom case (1) is disposed between the through hole of the panel (2) and the thermostat (3);
an elastic drive structure that drives the thermostat (3) to protrude and retract is provided at the thermostat (3);
the elastic drive structure is a driving spring (5); a mounting groove body (36) which is open downward is formed at an outer sidewall of the inner bracket (31); an upper end of the driving spring (5) is provided in the mounting groove body (36), and a lower end of the driving spring (5) is coupled to a support frame (4) in the bottom case (1); and the inner bracket (31) slides along a guide hole (41) of the support frame (4); and
a through hole protection component is disposed in the through hole of the panel (2), the through hole protection component comprises a wrapping sleeve (8) disposed in the through hole, an annular limiting plate that contacts an upper end of the panel (2) is formed at an upper end of the wrapping sleeve (8), and a locking nut (81) or a locking spring leaf (82) is provided at a lower end of the wrapping sleeve (8).

2. The electromagnetic oven, as recited in claim 1, wherein the temperature measuring element (33) which measures the temperature of the temperature sensing cover (32) in the contact manner comprises a thermistor (35); the thermistor (35) is fixed in the inner cavity of the inner bracket (31) and contacts a lower end of the temperature sensing cover (32); a fixed body is disposed in the inner cavity of the inner bracket (31), and the thermistor (35) is disposed in the fixed body.

3. The electromagnetic oven, as recited in claim 1, wherein the temperature measuring element (33) which measures the temperature of the temperature sensing cover (32) in the non-contact manner comprises an infrared probe (38); the infrared probe (38) is disposed in the inner cavity of the inner bracket (31), and a measuring end of the infrared probe (38) faces a lower end of the temperature sensing cover (32).

4. The electromagnetic oven, as recited in claim 1, wherein the temperature sensing cover (32) envelops an upper end of the inner bracket (31) or is inserted into the inner cavity of the inner bracket (31).

5. The electromagnetic oven, as recited in claim 4, wherein a mounting counterbore is formed at a lower end of the temperature sensing cover (32), and the mounting counterbore envelops the upper end of the inner bracket (31).

6. The electromagnetic oven, as recited in claim 4, wherein an engaging buckle is formed at a lower end of the temperature sensing cover (32), an engaging groove is formed at the upper end of the inner bracket (31), and the engaging buckle and the engaging groove are fixed together.

7. The electromagnetic oven, as recited in claim 4, wherein a sleeve inserted into the inner cavity of the inner bracket (31) is formed at a lower end of the temperature sensing cover (32), and an annular groove (39) for fixing is formed at an outer wall of the sleeve.

8. The electromagnetic oven, as recited in claim 7, wherein a convex ring that is fixed to the annular groove (39) is formed at an inner wall of the inner cavity of the inner bracket (31), or a potted insulating layer connecting to the inner wall of the inner cavity is provided in the annular groove (39).

9. The electromagnetic oven, as recited in claim 1, wherein a transverse through hole is formed at a lower end of the inner bracket (31), and a limiting pin (6) for limiting a protruding height of the thermostat (3) is provided in the transverse through hole.

10. The electromagnetic oven, as recited in claim 1, wherein the guide hole (41) is formed in the support frame (4), a lower groove body (42) for accommodating the driving spring (5) is formed at an inner edge of the guide hole (41), and the lower groove body (42) is open upward.

11. The electromagnetic oven, as recited in claim 1, wherein a support protrusion is formed at an inner wall of the bottom case (1), an insulating layer (7) is provided on the support protrusion, the panel (2) is provided on the insulating layer (7), and a fixing plate (72) for fixing the panel (2) is provided on an upper end of the bottom case (1).

12. The electromagnetic oven, as recited in claim 11, wherein an inclined water guide surface is formed at an upper end of the insulating layer (7), a water guide hole (71) is formed at the insulating layer, and a water retaining rib (73) for protecting an electrical component is formed in the bottom case (1).

13. The electromagnetic oven, as recited in claim 10, wherein the drainage structure comprises a bracket guide tube (43) disposed at a bottom of the lower groove body (42), and the bracket guide tube (43) is inserted into a flow guide hole of the bottom case (1).

14. The electromagnetic oven, as recited in claim 1, wherein the sealing structure is a sealing ring, which is disposed in the through hole, and an inner circle of the sealing ring contacts the thermostat (3).

15. The electromagnetic oven, as recited in claim 1, wherein the sealing structure comprises an assembly sleeve (9) disposed at the through hole, a sealing gasket (91) is provided at an upper end of the assembly sleeve (9), an upper end of the sealing gasket (91) contacts the cooking pot, and a lower end of the sealing gasket (91) contacts the temperature sensing cover (32) of the thermostat (3).

16. The electromagnetic oven, as recited in claim 1, wherein the sealing structure comprises a sealing sleeve (92), an upper end of the sealing sleeve (92) is fixed to a lower end of the panel (2), and an engaging groove (93) engaged with a mounting plate of the inner bracket (31) is formed at an inner wall of the sealing sleeve (92).

17. The electromagnetic oven, as recited in claim 9, wherein a protrusion limiting device for limiting the protruding height of the thermostat (3) is provided at a sidewall of the thermostat (3), the protrusion limiting device comprises a protrusion limiting rib (61), and a centering limiting rib (62) for guiding during a protruding and retracting process of the thermostat (3) is disposed at the sidewall of the thermostat (3).

\* \* \* \* \*